(12) United States Patent
Laporte et al.

(10) Patent No.: US 11,742,889 B2
(45) Date of Patent: Aug. 29, 2023

(54) EIGENVALUE-BASED PASSIVE INTERMODULATION DETECTION

(71) Applicant: Telefonaktiebolaget LM Ericsson (publ), Stockholm (SE)

(72) Inventors: Pierre-Andre Laporte, Gatineau (CA); Mark Wyville, Ottawa (CA); Bilel Fehri, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 155 days.

(21) Appl. No.: 17/437,581

(22) PCT Filed: Apr. 9, 2019

(86) PCT No.: PCT/IB2019/052913
§ 371 (c)(1),
(2) Date: Sep. 9, 2021

(87) PCT Pub. No.: WO2020/208400
PCT Pub. Date: Oct. 15, 2020

(65) Prior Publication Data
US 2022/0149889 A1 May 12, 2022

(51) Int. Cl.
*H04B 1/525* (2015.01)
*H04B 1/10* (2006.01)
(Continued)

(52) U.S. Cl.
CPC ............. *H04B 1/525* (2013.01); *H04B 1/109* (2013.01); *H04B 1/1027* (2013.01); *H04B 1/123* (2013.01); *H04B 7/0456* (2013.01)

(58) Field of Classification Search
CPC ........ H04B 1/10; H04B 1/1027; H04B 1/109; H04B 1/123; H04B 1/16; H04B 1/525; H04B 7/0456; H04B 7/0478
See application file for complete search history.

(56) References Cited

U.S. PATENT DOCUMENTS 5,321,847 A 6/1994 Johnson, Jr.
5,937,011 A 8/1999 Carney et al.
(Continued)

FOREIGN PATENT DOCUMENTS

EP 1067698 B1 11/2005
WO 2003/030416 A1 4/2003
(Continued)

OTHER PUBLICATIONS

Hastie et al., The Elements of Statistical Learning, 2nd Edition, Berlin: Springer, 2008, pp. 337-358. Accessed on Dec. 4, 2018. [Online]. Available: https://web.stanford.edu/~hastie/Papers/ESLII.pdf, consisting of 22 pages.
(Continued)

*Primary Examiner* — Quochien B Vuong
(74) *Attorney, Agent, or Firm* — Christopher & Weisberg, P.A.

(57) ABSTRACT

A method and network node for detection of passive intermodulation (PIM) are disclosed. According to one aspect, a method includes determining values of a covariance matrix based at least in part on uplink signals received by the network node radio. The method also includes determining a plurality of uplink (UL) channel 5 eigenvalues based at least in part on an eigen-component acquisition technique. The method further includes determining a presence or absence of PIM based at least in part on a plurality of the UL channel eigenvalues.

22 Claims, 7 Drawing Sheets

(51) Int. Cl.
H04B 7/0456 (2017.01)
H04B 1/12 (2006.01)

(56) References Cited

U.S. PATENT DOCUMENTS

| | | | |
|---|---|---|---|
| 6,201,993 B1 | 3/2001 | Kruse et al. | |
| 6,374,096 B1 | 4/2002 | Parr | |
| 8,058,880 B2 | 11/2011 | Bradley et al. | |
| 8,369,812 B2 | 2/2013 | Lehman | |
| 8,903,324 B1 | 12/2014 | Bradley | |
| 8,942,310 B2 * | 1/2015 | Miyatani | H04B 7/0408 375/295 |
| 8,983,454 B2 | 3/2015 | Bevan et al. | |
| 8,995,517 B2 | 3/2015 | Delforce et al. | |
| 9,438,285 B2 | 9/2016 | Wyville | |
| 9,461,697 B2 | 10/2016 | Yu et al. | |
| 9,532,252 B2 | 12/2016 | Hariharan et al. | |
| 9,614,557 B1 | 4/2017 | Mayer et al. | |
| 9,673,847 B1 | 6/2017 | Mayer et al. | |
| 9,894,623 B2 | 2/2018 | Dussmann et al. | |
| 9,979,408 B2 | 5/2018 | Mayer et al. | |
| 10,039,022 B2 | 7/2018 | Tsui et al. | |
| 10,075,220 B2 * | 9/2018 | Lee | H04B 7/065 |
| 10,182,409 B2 | 1/2019 | Dussmann et al. | |
| 10,187,098 B1 | 1/2019 | Tsui et al. | |
| 10,243,629 B2 * | 3/2019 | Yang | H04B 7/0456 |
| 10,812,121 B2 * | 10/2020 | Abdelmonem | H04B 1/109 |
| 11,025,350 B2 * | 6/2021 | Wilson | H04B 7/0413 |
| 2002/0012404 A1 | 1/2002 | Ahn | |
| 2003/0125091 A1 | 7/2003 | Choi et al. | |
| 2003/0232600 A1 | 12/2003 | Montgomery et al. | |
| 2008/0039045 A1 | 2/2008 | Filipovic et al. | |
| 2009/0322421 A1 | 12/2009 | Mueller et al. | |
| 2010/0159858 A1 | 6/2010 | Dent et al. | |
| 2010/0164504 A1 | 7/2010 | Bradley | |
| 2013/0182753 A1 | 7/2013 | Delforce et al. | |
| 2013/0310023 A1 | 11/2013 | Bevan et al. | |
| 2014/0153418 A1 | 6/2014 | Hariharan | |
| 2014/0161005 A1 | 6/2014 | Laurent-Michel | |
| 2014/0378067 A1 | 12/2014 | Au | |
| 2015/0087242 A1 | 3/2015 | Bain et al. | |
| 2015/0145528 A1 | 5/2015 | Yeo et al. | |
| 2015/0222371 A1 | 8/2015 | Afkhami et al. | |
| 2015/0223083 A1 | 8/2015 | Maca et al. | |
| 2015/0244414 A1 | 8/2015 | Yu et al. | |
| 2015/0249965 A1 | 9/2015 | Dussmann et al. | |
| 2015/0257165 A1 | 9/2015 | Gale et al. | |
| 2015/0318882 A1 | 11/2015 | Wyville | |
| 2015/0358144 A1 | 12/2015 | Fleischer et al. | |
| 2016/0028497 A1 | 1/2016 | Holt et al. | |
| 2016/0182136 A1 | 6/2016 | Zhang et al. | |
| 2016/0322995 A1 | 11/2016 | Bevan et al. | |
| 2018/0081047 A1 | 3/2018 | Gander | |
| 2018/0115374 A1 | 4/2018 | Mishra et al. | |

FOREIGN PATENT DOCUMENTS

| | | |
|---|---|---|
| WO | 2014/012585 A1 | 1/2014 |
| WO | 2014/083361 A1 | 6/2014 |
| WO | 2014/085345 A1 | 6/2014 |
| WO | 2017/006155 A1 | 1/2017 |
| WO | 2017/153921 A1 | 9/2017 |
| WO | 2018/147775 A1 | 8/2018 |
| WO | 2019/069117 A1 | 4/2019 |

OTHER PUBLICATIONS

International Search Report and Written Opinion dated Nov. 15, 2019 issued in PCT Application No. PCT/IB2019/052140, consisting of 16 pages.
Hengyao Bao et al., Perturbation-Assisted PABR Reduction for Large-Scale MIMO-OFDM Systems via ADMM; IEEE, Jul. 10, 2016, consisting of 9 pages.
Hengyao Bao et al., An Efficient Bayesian PABR Reduction Method for OFDM-Based Massive MIMO Systems; IEEE Transactions on Wireless Communications, vol. 15, No. 6, Jun. 2016, consisting of 13 pages.
Miao Yao, Sustainable Green Networking: Exploiting Degrees of Freedom Towards Energy-Efficient 5G Systems; Wireless Networks, Nov. 25, 2017; Springer Science + Business Media, LLC, consisting of 10 pages.
Christoph Studer et al., PAR-Aware Large-Scale Multi-User MIMO-OFDM Downlink; IEEE Journal on Selected Areas in Communications, vol. 31, No. 2, Feb. 2013, consisting of 11 pages.
Goodfellow et al., "Deep Learning" @ http://www.deeplearningbook. org; MIT Press 2016; pp. 196-200 and pp. 504-513.
International Search Report and Written Opinion of the International Searching Authority dated Jun. 6, 2017 issued in PCT Application Serial No. PCT/IB2017/051342, consisting of 9 pages.
International Preliminary Report on Patentability dated Sep. 11, 2018 issued in PCT Application Serial No. PCT/IB2017/051342, consisting of 7 pages.
International Search Report and Written Opinion of the International Searching Authority dated Mar. 16, 2016 issued in PCT Application Serial No. PCT/IB2015/055174, consisting of 10 pages.
International Preliminary Report on Patentability dated Jan. 9, 2018 issued in PCT Application Serial No. PCT/IB2015/055174, consisting of 7 pages.
International Search Report and Written Opinion of the International Searching Authority dated Dec. 10, 2019 issued in PCT Application Serial No. PCT/IB2019/053567, consisting of 14 pages.
Christoph Studer et al., Democratic Representations, Cornell University Library, Jan. 15, 2014, consisting of 36 pages.
International Search Report and Written Opinion of the International Searching Authority dated Jan. 3, 2020 issued in PCT Application Serial No. PCT/IB2019/052913, consisting of 10 pages.
Non-Final Office Action dated Feb. 25, 2019 issued in U.S. Appl. No. 15/739,821, consisting of 18 pages.

* cited by examiner

EIGENVALUE-BASED PASSIVE INTERMODULATION DETECTION

CROSS-REFERENCE TO RELATED APPLICATIONS

This application is a Submission Under 35 U.S.C. § 371 for U.S. National Stage Patent Application of International Application Number: PCT/IB2019/052913, filed Apr. 9, 2019 entitled "EIGENVALUE-BASED PASSIVE INTERMODULATION DETECTION," the entirety of which is incorporated herein by reference.

TECHNICAL FIELD

This disclosure relates to wireless communication and in particular, to detection of passive intermodulation (PIM) in a network node radio based on uplink (UL) channel eigenvalues.

BACKGROUND

Passive Inter-Modulation (PIM) is a concern for operators of cellular communication networks as more downlink (DL) channels are transmitted from cellular network node, e.g., base station radio, sites to wireless devices (WD). To add to the challenge, newly added radio channels belong to a rising number of radio bands which increase the odds of having passive inter-modulations that desensitize the uplink (UL) receivers of the radio site.

A growing number of cellular operators now require that the presence of PIM in the UL channels be reported by radio equipment so that PIM mitigation measures can then be taken.

Some PIM detection (PIM-D) techniques include the following:

Measuring the noise floor in the uplink channels during transmission time intervals (TTI) where no uplink traffic is scheduled and in guard bands of the uplink channels when uplink traffic is present. In this approach, some PIM occurrences may be missed during site operation since PIM may not be present during the UL TTIs where no traffic is scheduled and PIM may not appear in the UL channel guard bands.

Correlation of the signal envelope for each of the DL channels with the uplink signal envelope. In this approach, the PIM involving DL carriers that are external to the radio, such as those transmitted by the same operator in another radio band with different equipment, may go unnoticed. In addition, the PIM levels may be so low with respect to the UL noise floor that the envelope correlation may not detect any anomaly.

Generating a non-linear model of the PIM from the transmitted DL signals. The modelled PIM is then correlated with the UL channels. This approach suffers one, some or all of the following drawbacks:

The technique does not scale well when the number of DL antennas involved in creating the PIM increases as in massive-multiple input multiple output (MIMO) systems. The number of non-linear terms that are required to create the PIM model increases exponentially with the number of DL antennas.

The PIM model must be tailored to suit a specific carrier configuration with non-linear terms that match the intermodulation band which creates the PIM problem. Therefore, the PIM model must be adjusted for every carrier configuration. This makes the solution hard to scale to various deployment scenarios.

The PIM model must be tuned to the exact frequency offset with respect to the UL channel. In the situation where there are multiple victim UL channels, each of them requires the PIM model to be tuned to a different frequency offset and may also require a different PIM model.

The non-linear order of the model must closely match that of the PIM, which may fluctuate over time.

Oversampling is needed when generating the PIM model to avoid aliasing, which increases the implementation cost.

SUMMARY

Some embodiments advantageously provide a method and network node for detection of passive intermodulation (PIM) in a network node radio based on uplink (UL) channel eigenvalues.

In some embodiments, an algorithm for PIM detection may operate in live traffic conditions so that no special mode of operation is needed. An algorithm may detect self-generated PIM as well as PIM generated by other radio equipment. Also, the techniques may scale well with growing numbers of DL and UL antennas and as the number of UL channels increases. Some embodiments can readily support various carrier configurations without any customization. Also, PIM levels below a noise floor may be detected. Implementation costs may be low since the algorithm may be performed at a baseband sampling rate.

According to one aspect, a method for detection of passive intermodulation, PIM, in a network node based at least in part on uplink, UL, channel eigenvalues is provided. The method includes determining, via the values of a covariance matrix based at least in part on uplink signals received by the network node radio. The method also includes determining a plurality of UL channel eigenvalues based at least in part on an eigen-component acquisition technique. The method also includes determining a presence or absence of PIM based at least in part on a plurality of the UL channel eigenvalues.

According to this aspect, in some embodiments, the eigen-component acquisition technique is one of determining eigenvalues from the covariance matrix values or subspace tracking. In some embodiments, the plurality of UL channel eigenvalues are computed in the time-domain and/or in the frequency-domain, using an entire channel bandwidth and/or a frequency resolution less than the entire channel bandwidth. In some embodiments, different UL channel eigenvalues are determined for each of a plurality of polarizations of antennas of the network node radio and the presence or absence of PIM is determined for each of the plurality of polarizations. In some embodiments, the plurality of UL channel eigenvalues are mapped against a corresponding downlink transmitted power to determine the presence or absence of PIM. In some embodiments, the UL channel eigenvalues failing to meet an objective criteria are excluded from the process of determining a presence or absence of PIM. In some embodiments, a machine learning algorithm processes at least some of the UL channel eigenvalues to determine the presence or absence of PIM. In some embodiments, the machine learning algorithm is one of a regression method, a classification method or a combination of the two. In some embodiments, the plurality of UL channel eigenvalues are evaluated without aid of a machine learning algorithm to determine a presence or absence of PIM. In some embodiments, the process of determining the presence or absence of PIM is performed in both the time domain and the frequency domain to produce a time domain report of PIM presence and a frequency domain report of PIM presence. In some embodiments, the time domain report and the frequency domain report are separately weighted and combined to produce a composite report of PIM presence.

According to another aspect, a network node radio configured to detect passive intermodulation, PIM, based at least in part on uplink, UL, channel eigenvalues. The network node includes processing circuitry configured to determine values of a covariance matrix based at least in part on uplink signals received by the network node radio. The processing circuitry is also configured to determine a plurality of UL channel eigenvalues based at least in part on an eigen-component acquisition technique. The processing circuitry is also configured to determine a presence or absence of PIM based at least in part on a plurality of the UL channel eigenvalues.

According to this aspect, in some embodiments, the eigen-component acquisition technique is one of determining eigenvalues from the covariance matrix values or subspace tracking. In some embodiments, the plurality of UL channel eigenvalues are computed in the time domain and/or frequency domain, using an entire channel bandwidth and/or a frequency resolution less than the entire channel bandwidth. In some embodiments, different UL channel eigenvalues are determined for each of a plurality of polarizations of antennas of the network node radio and the presence or absence of PIM is determined for each of the plurality of polarizations. In some embodiments, the plurality of UL channel eigenvalues are mapped against a corresponding downlink transmitted power to determine the presence or absence of PIM. In some embodiments, UL channel eigenvalues failing to meet an objective criteria are excluded from the process of determining a presence or absence of PIM. In some embodiments, a machine learning algorithm processes at least some of the UL channel eigenvalues to determine the presence or absence of PIM. In some embodiments, the machine learning algorithm is one of a linear regression algorithm, a kernel regression algorithm, a polynomial regression algorithm and a spline regression algorithm. In some embodiments, the plurality of UL channel eigenvalues are evaluated without aid of a machine learning algorithm to determine a presence or absence of PIM. In some embodiments, the process of determining the presence or absence of PIM is performed in both the time domain and the frequency domain to produce time domain report of PIM presence and a frequency domain report of PIM presence. In some embodiments, the time domain report and the frequency domain report are separately weighted and then combined to produce a composite report of PIM presence.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
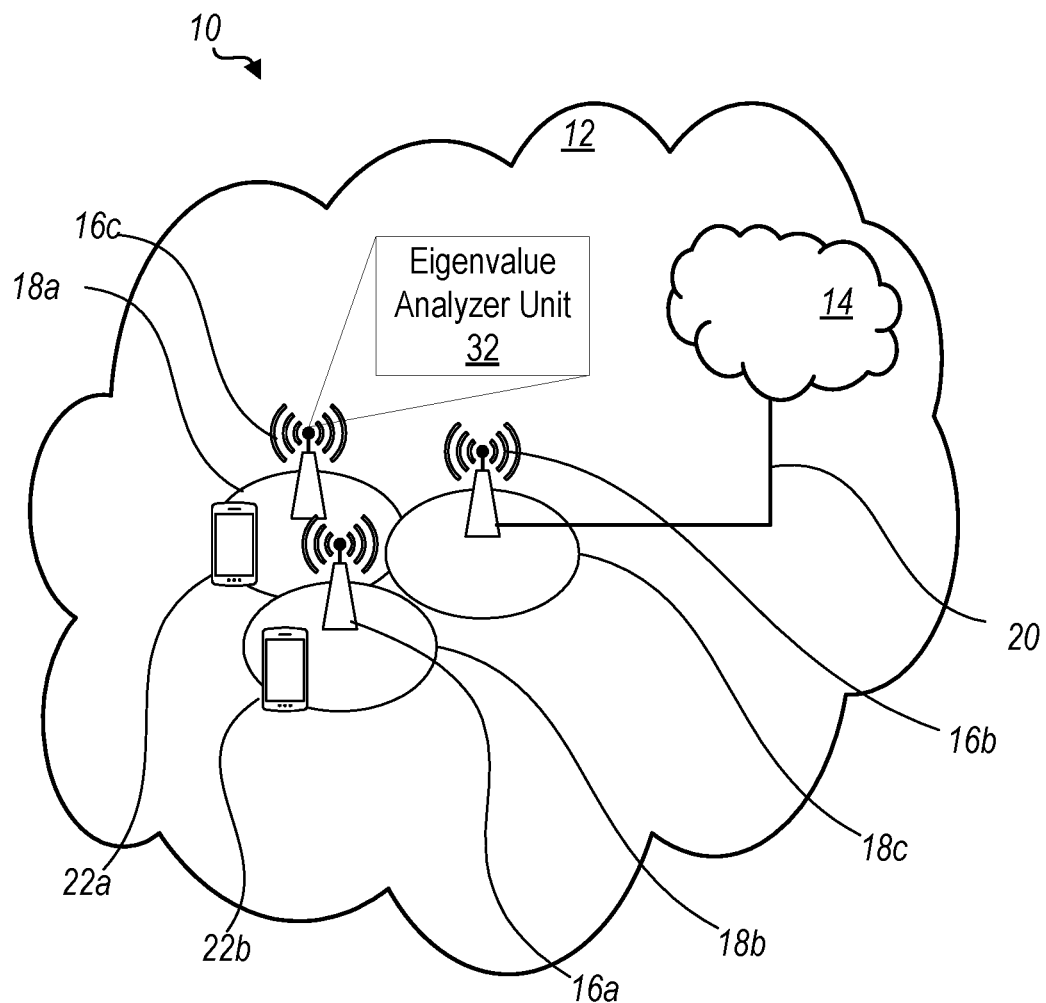
FIG. 1 is a block diagram of a wireless communication system with at least one network node capable of detecting PIM according to methods described herein.

Before describing in detail exemplary embodiments, it is noted that the embodiments reside primarily in combinations of apparatus components and processing steps related to detection of passive intermodulation (PIM) in a network node radio based on uplink (UL) channel eigenvalues. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments include methods for detection of passive intermodulation (PIM). According to one aspect, a method includes determining values of a covariance matrix based at least in part on uplink signals received by the network node radio. The method also includes determining UL channel eigenvalues based at least in part on an eigen-component acquisition technique. The method further includes determining a presence or absence of PIM based at least in part on a plurality of the UL channel eigenvalues. An eigen-component acquisition technique may include determining eigenvalues from the covariance matrix values or subspace tracking.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include an eigenvalue analyzer unit 32 configured to determine UL channel eigenvalues based at least in part on an eigen-component acquisition technique. The network node 16 is also configured to include a covariance matrix unit 56 configured to determine the values of a covariance matrix based at least in part on uplink signals received by the network node radio. The network node 16 is also configured to include a PIM detection unit 58 configured to determine a presence or absence of PIM based at least in part on a plurality of the UL channel eigenvalues.

Example implementations, in accordance with an embodiment, of the WD 22 and network node 16 discussed in the preceding paragraphs will now be described with reference to FIG. 2.

The communication system 10 includes a network node 16 provided in a communication system 10 and including hardware 38 enabling it to communicate with the WD 22. The hardware 38 may include a radio interface 42 for setting up and maintaining at least a wireless connection 46 with a WD 22 located in a coverage area 18 served by the network node 16. The radio interface 42 may be formed as or may include, for example, one or more radio frequency (RF) transmitters, one or more RF receivers, and/or one or more RF transceivers.

In the embodiment shown, the hardware 38 of the network node 16 further includes processing circuitry 48. The processing circuitry 48 may include a processor 50 and a memory 52. In particular, in addition to or instead of a processor, such as a central processing unit, and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) the memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 52, or stored in external memory (e.g., database, storage array, network storage device, etc.) accessible by the network node 16 via an external connection. The software 44 may be executable by the processing circuitry 48. The processing circuitry 48 may be configured to control any of the methods and/or processes described herein and/or to cause such methods, and/or processes to be performed, e.g., by network node 16. Processor 50 corresponds to one or more processors 50 for performing network node 16 functions described herein. The memory 52 is configured to store data, programmatic software code and/or other information described herein. In some embodiments, the software 44 may include instructions that, when executed by the processor 50 and/or processing circuitry 48, causes the processor 50 and/or processing circuitry 48 to perform the processes described herein with respect to network node 16. For example, processing circuitry 48 of the network node 16 may include an eigenvalue analyzer unit 32 configured to determine UL channel eigenvalues based at least in part on an eigen-component acquisition technique. The network node 16 is also configured to include a covariance matrix unit 56 configured to determine the values of a covariance matrix based at least in part on uplink signals received by the network node radio. The network node 16 is also configured to include a PIM detection unit 58 configured to determine a presence or absence of PIM based at least in part on a plurality of the UL channel eigenvalues.

The communication system 10 further includes the WD 22 already referred to. The WD 22 may have hardware 60 that may include a radio interface 62 configured to set up and maintain a wireless connection 64 with a network node 16 serving a coverage area 18 in which the WD 22 is currently located. The radio interface 62 may be formed as or may include, for example, one or more RF transmitters, one or more RF receivers, and/or one or more RF transceivers.

The hardware 60 of the WD 22 further includes processing circuitry 64. The processing circuitry 64 may include a processor 66 and memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 70, which is stored in, for example, memory 68 at the WD 22, or stored in external memory (e.g., database, storage array, network storage device, etc.) accessible by the WD 22. The software 70 may be executable by the processing circuitry 64. The software 70 may include a client application 72. The client application 72 may be operable to provide a service to a human or non-human user via the WD 22.

The processing circuitry 64 may be configured to control any of the methods and/or processes described herein and/or to cause such methods, and/or processes to be performed, e.g., by WD 22. The processor 66 corresponds to one or more processors 66 for performing WD 22 functions described herein. The WD 22 includes memory 68 that is configured to store data, programmatic software code and/or other information described herein. In some embodiments, the software 70 and/or the client application 72 may include instructions that, when executed by the processor 66 and/or processing circuitry 64, causes the processor 66 and/or processing circuitry 64 to perform the processes described herein with respect to WD 22.

Figure 2:
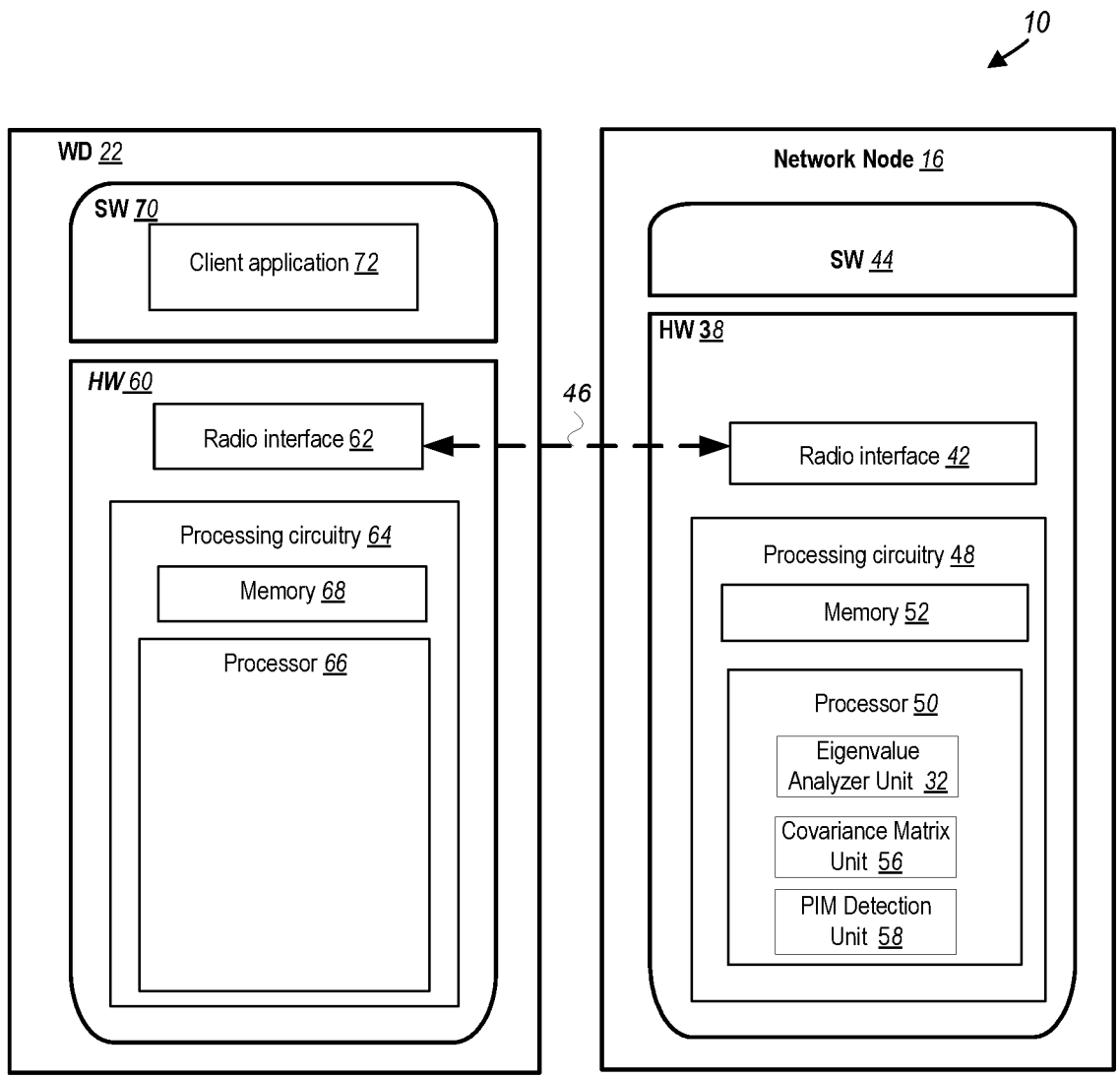
FIG. 2 is a block diagram of a network node and wireless device, the network node capable of detecting PIM according to methods described herein.

In some embodiments, the inner workings of the network node 16 and WD 22 may be as shown in FIG. 2 and independently, the surrounding network topology may be that of FIG. 1.

The wireless connection 46 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 1 and 2 show various "units" such as eigenvalue analyzer unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
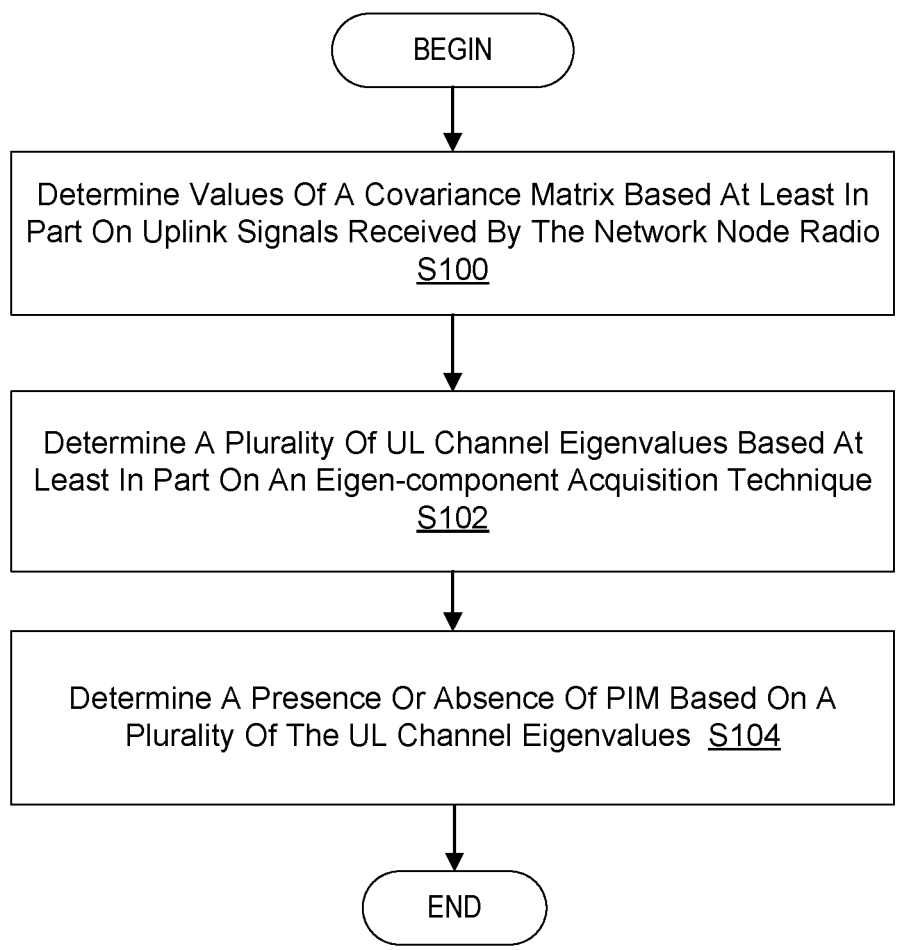
FIG. 3 is a flowchart of an exemplary process for detecting PIM according to methods described herein.

FIG. 3 is a flowchart of an exemplary process in a network node 16 for detecting PIM in accordance with the principles of the present disclosure. One or more blocks described herein may be performed by one or more elements of network node 16 such as by one or more of processing circuitry 48 (including the eigenvalue analyzer unit 32, covariance matrix unit 56, and PIM detection unit 58), processor 50, and/or radio interface 42. Network node 16 is configured to determine, via covariance matrix unit 56, values of a covariance matrix based at least in part on uplink signals received by the network node radio (Block S100). The process includes determining, via the eigenvalue analyzer unit 32, UL channel eigenvalues based at least in part on an eigen-component acquisition technique (Block S102). The process also includes determining, via the PIM detection unit 58, a presence or absence of PIM based at least in part on a plurality of the UL channel eigenvalues (Block S104).

Figure 4:
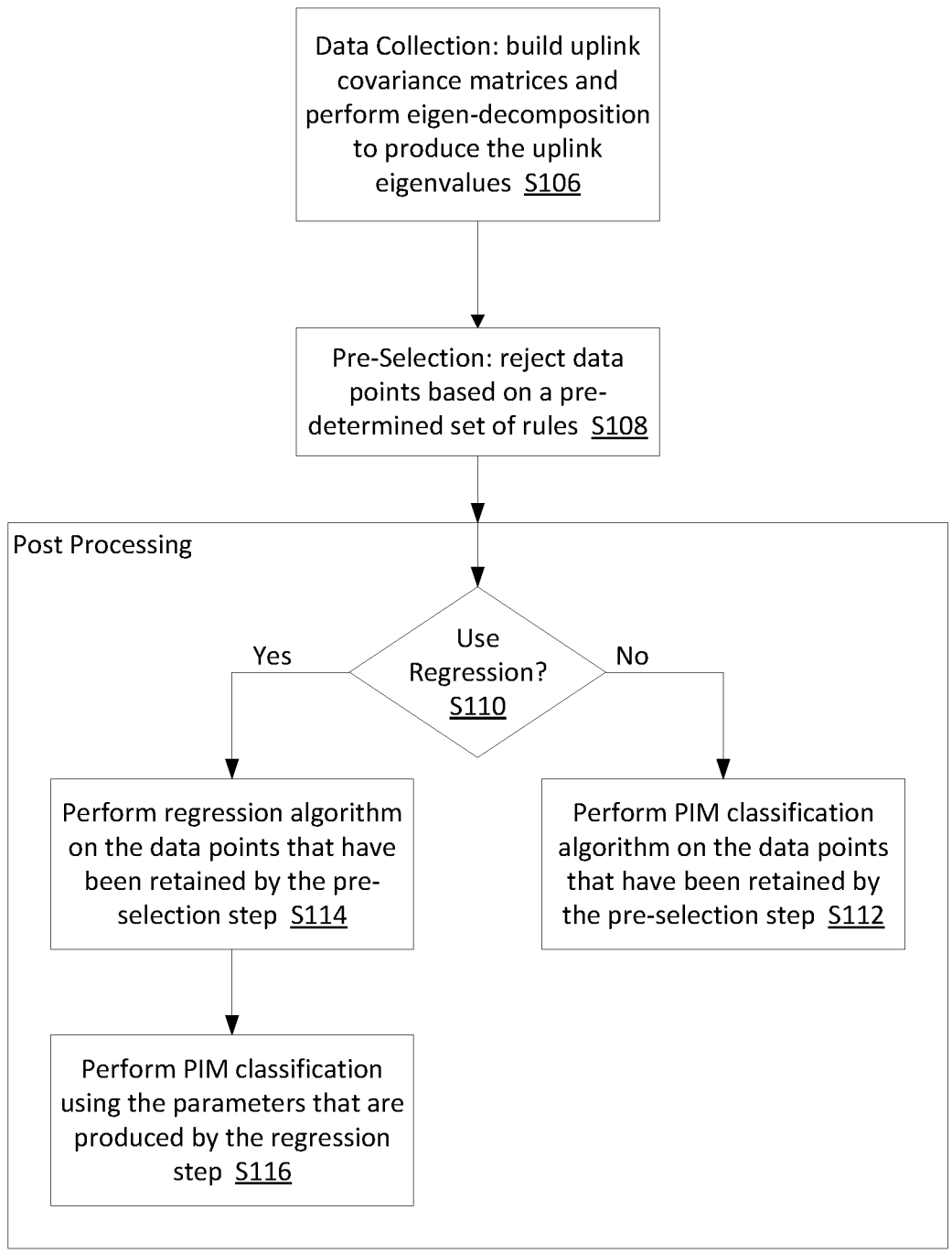
FIG. 4 is a high level flowchart of PIM algorithm detection algorithm steps.

FIG. 4 is a high level flowchart of an exemplary process for detecting PIM in the network node 16. The process includes building, via the covariance matrix unit 56, uplink covariance matrices and performing, via the eigenvalue analyzer unit 32, eigen-decomposition to produce the uplink eigenvalues (Block S106). The process also includes rejecting, via the processing circuitry 48, data points based on a predetermined set of rules (Block S108). Then, a decision is reached, via the processing circuitry 48, whether to use regression to determine PIM (Block S110). If regression is not used, the PIM classification is performed by an algorithm implemented in the PIM detection unit 58 on the data points that have been retained by the pre-selection step (Block S112). If regression is to be used, the process includes performing regression, via the PIM detection unit 58, on the data points that have been retained by the pre-selection step (Block S114). The process also includes performing, via the PIM detection unit 58, PIM classification using the parameters that are produced by the regression step (Block S116).

Having described the general process flow of arrangements of the disclosure and having provided examples of hardware and software arrangements for implementing the processes and functions of the disclosure, the sections below provide details and examples of arrangements for detection of passive intermodulation (PIM) in a network node radio based on uplink (UL) channel eigenvalues.

In some embodiments, a PIM detection method is based on the processing of uplink channel eigenvalues. For a network node 16, such as a base station, with N antennas, the total received uplink signal vector $r_{UL} \in \mathbb{C}^{N \times 1}$ contains four contributions as shown in equation (1):

$$r_{UL} = r_{UE} + r_{intercell} + r_{PIM} + r_{noise} \quad (1)$$

where:

$r_{UE} \in \mathbb{C}^{N \times 1}$ is the scheduled WD's contribution vector;

$r_{intercell} \in \mathbb{C}^{N \times 1}$ is the total interference vector coming from the adjacent cells;

$r_{PIM} \in \mathbb{C}^{N \times 1}$ is the PIM vector; and $r_{noise} \in \mathbb{C}^{N \times 1}$ is the noise vector.

The total received uplink signal covariance matrix $R_{UL} \in \mathbb{C}^{N \times N}$ may be expressed as:

$$R_{UL} = E[r_{UL} \cdot r_{UL}^H] \quad (2)$$

where $E[\cdot]$ is the mathematical expectation operator; and $(\cdot)^H$ is the Hermitian transpose operator.

The eigen-decomposition of the covariance matrix may resemble the following form:

$$R_{UL} = [U_{UE} | U_{intercell} | U_{PIM} | U_{Noise}] \cdot \begin{bmatrix} \Sigma_{UE} & 0 & 0 & 0 \\ 0 & \Sigma_{intercell} & 0 & 0 \\ 0 & 0 & \Sigma_{PIM} & 0 \\ 0 & 0 & 0 & \Sigma_{Noise} \end{bmatrix} \cdot [U_{UE} | U_{intercell} | U_{PIM} | U_{Noise}]^H \quad (3)$$

where $U_{UE} \in \mathbb{C}^{N \times K}$ corresponds to the K scheduled WD's eigenvectors. In one embodiment, K is known: it is an input from the scheduler;

$U_{intercell} \in \mathbb{C}^{N \times M}$ is a matrix containing the M intercell interference eigenvectors;

$U_{PIM} \in \mathbb{C}^{N \times P}$ corresponds to the P PIM eigenvectors;

$U_{Noise} \in \mathbb{C}^{N \times (N-K-M-P)}$ is the noise subspace;

$\Sigma_{UE}$ is a K×K diagonal matrix with the diagonal elements set to the K scheduled uplink WD's eigenvalues $\lambda_0, \ldots, \lambda_{K-1}$;

$\Sigma_{intercell}$ is a M×M diagonal matrix with the diagonal elements set to the M intercell interference eigenvalues $\lambda_K, \ldots, \lambda_{K+M-1}$;

$\Sigma_{PIM}$ is a P×P diagonal matrix with the diagonal elements set to the P intercell interference eigenvalues $\lambda_{K+M}, \ldots, \lambda_{K+F+M+P-1}$; and $\Sigma_{Noise}$ is a (N−K−M−P)×(N−K−M−P) diagonal matrix with the diagonal elements set to the (N−K−M−P) noise eigenvalues $\lambda_{K+M+P}, \ldots, \lambda_{N-1}$.

The uplink covariance matrix $R_{UL}$ may be built, via the covariance matrix unit 56, in the time-domain using the entire channel bandwidth or in the frequency-domain using a smaller bandwidth resolution. In addition, the $R_{UL}$ covariance matrix can be built by combining the antennas from all polarizations in a single $r_{UL}$ vector or alternatively, it can be determined for each of the antenna polarizations separately.

Eigenvalue-Based PIM Detection in the Time Domain

Self-generated PIM problems may involve at least one downlink carrier that is transmitted by the radio equipment, such as radio interface 42, that is victim of the PIM interference in at least one uplink channel. One feature of the self-generated PIM interference is that its power varies as a function of the transmitted downlink power, which in turn can vary on an orthogonal frequency division multiplex (OFDM) symbol basis.

Figure 5:
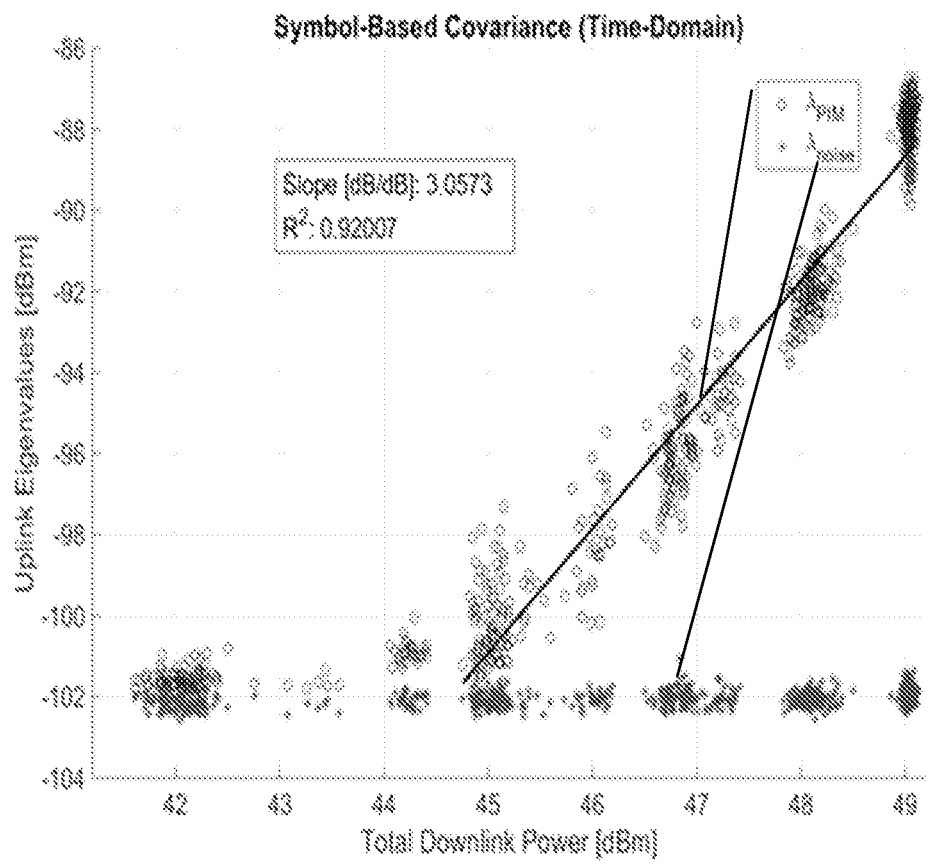
FIG. 5 is an illustration of PIM detection using symbol-based uplink (UL) eigenvalues in the time domain.

Therefore, in one embodiment, some uplink covariance matrices may be built on an OFDM symbol basis in the time-domain using the $r_{UL}$ vector. The covariance matrices are eigen-decomposed, via the eigenvalue analyzer unit 32, and the resulting eigenvalues are mapped, via the processing circuitry 48, against the corresponding symbol-based DL transmitted power. FIG. 5 shows an example of a scatter plot that is created by such a mapping process. This plot is for illustration purpose only. In real communication systems, the data would be stored in memory 52 for further processing by digital algorithms, including machine learning algorithms included in eigenvalue analyzer unit 32 and/or PIM detection unit 58.

In the example of FIG. 5, only the noise and the PIM contributions are shown for clarity and simplicity. It should be noted that real-world OFDM systems may also have the contributions of the scheduled WDs 22 and that of the intercell interference given a time-domain $r_{UL}$ vector.

Once the eigenvalue data has been collected, it is preferable to perform processing steps, via the processing circuitry 48, that perform a pre-selection of the data points. This is useful to exclude any outliers that would bias the results. This is also where any prior knowledge about the problem may be introduced. In the example of FIG. 5, two rules may be applied:

The points where the total downlink power is less than 44.5 dBm may be discarded since PIM is not very apparent below that level; and/or The uplink eigenvalues may be at least 0.5 dB larger than the theoretical noise floor to be retained for further processing.

Other rules may be adopted.

Once the pre-selection step has been performed, a machine learning algorithm embedded in the PIM eigenvalue analyzer unit 32 and/or PIM detection unit 58 may process the selected data points. In the example of FIG. 5, a linear regression reveals a PIM slope "m" of about 3 dB for each dB of increase in downlink power with a coefficient of determination $R^2$=92.01% (very high confidence). In this example, the parameters of the regression m and $R^2$ are used to declare, or classify, via the PIM detection unit 58, whether PIM is present or not.

Very low PIM levels may be detected via the PIM detection unit 58 using eigenvalue-based PIM-Detection, including PIM levels that are below the noise floor. Indeed, PIM levels that are 6 dB below the noise floor may desensitize the UL by 1 dB worse than the noise floor. This is sufficient to notice a trend during the post-processing.

The regression step may provide quantitative information about the PIM levels and behavior, but it may not be mandatory in PIM-Detection where the primary output could be a binary report of the PIM presence. Therefore, in some alternative embodiments, one may directly feed the pre-selected data points to some classification algorithms implemented by eigenvalue unit 32 and/or PIM detection unit 58.

The following is a non-exhaustive list of regression techniques that may be used by the PIM detection unit 58 in the post processing steps to achieve quantitative information about PIM levels and behavior.

Linear regression;
Kernel regression;
Polynomial and spline regressions;
Generalized additive models; and
Neural Networks.

The following is a non-exhaustive list of potential classification methods that may be employed, via the processing circuitry 48, in the post processing steps:

Tree-Based Methods;
Support vector machines;
Expectation maximization;
Principal component analysis;
Clustering methods;
Boosting methods;
K-Nearest Neighbors;
Naive Bayes; and
Neural Networks Any classification method that is used may be configured and tuned to minimize the classification error rate. In addition, the discrimination threshold that is used for the final PIM report may be set to meet a desired operating point on the Receiver Operating Characteristic (ROC) curve. The ROC is a graph that maps the true positive rate to the false positive rate for a given decision threshold. This is useful for configuring the algorithm parameters.

In an alternative embodiment, instead of averaging the covariance matrices over a short time interval as in the symbol-based covariance embodiment, some long-term averages may be used. For example, the uplink covariance matrices may be averaged, via processing circuitry 48, over a time window that spans a few hundred milliseconds and even more, but only using the uplink symbols where the downlink power exceeds a predetermined threshold. The desired and the interfering WD traffic may be scheduled on a Transmit Time-Interval (TTI) basis of 1 millisecond in Long Term Evolution (LTE) networks. Therefore, the contributions from the scheduled WDs 22 and the intercell interference will average out over such a long time span, leaving PIM as the only source of dominant eigenvalues.

Eigenvalue-Based PIM Detection in the Frequency Domain

Frequency-domain processing offers some complementary PIM-Detection opportunities as the PIM eigenvalues do look like the PIM spectrum when plotted across frequency. Due to this feature, PIM problems that solely involve DL carriers that are transmitted by other equipment may be easier to detect in the frequency-domain.

Figure 6:
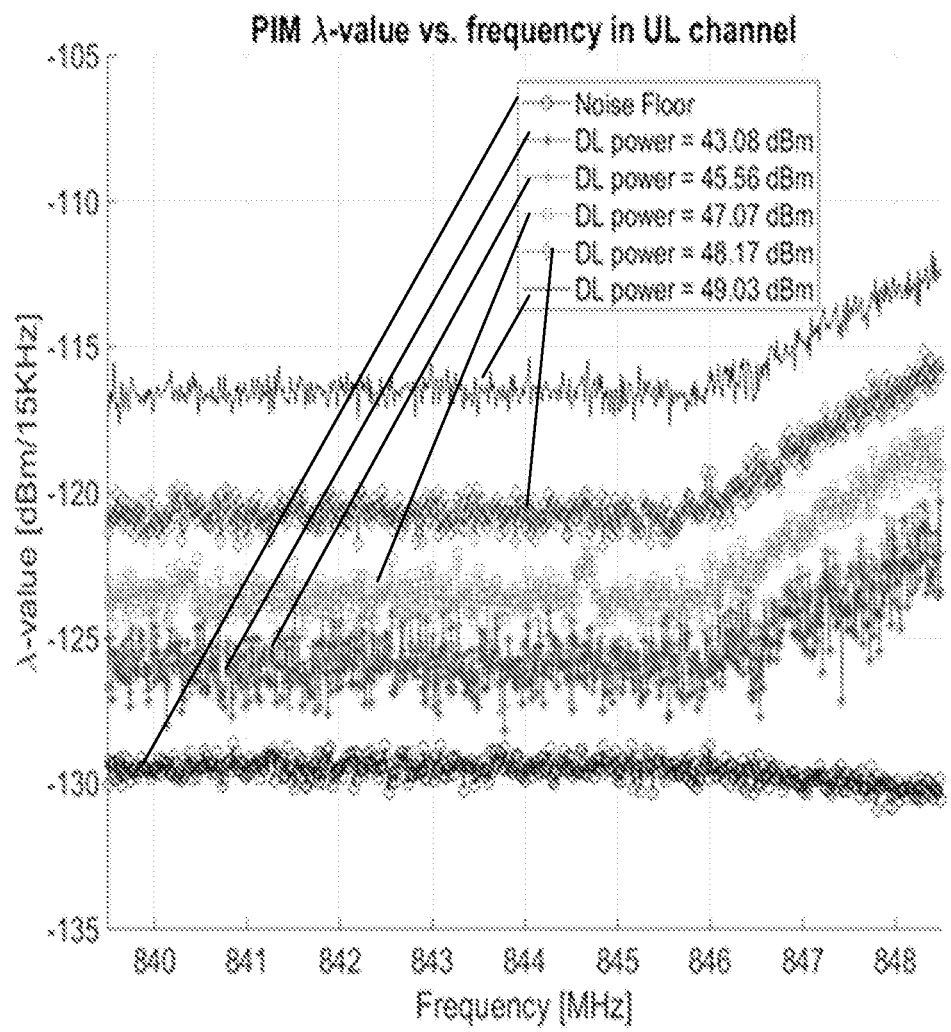
FIG. 6 is an illustration of frequency domain PIM eigenvalues versus frequency.

FIG. 6 shows a plot of self-generated PIM eigenvalues vs. frequency for various DL powers. Generally, as the downlink power increases, the values of the PIM eigenvalues increase.

The frequency-domain processing may be performed via processing circuitry 48 using various frequency granularities such as subcarrier based, physical resource blocks (PRB) based or sub-band based. The covariance matrices can be built via the covariance matric unit 56 using the $r_{UL}$ vector or using the $r_{residual}$ vector which is defined as follows:

$$r_{residual} = r_{UL} - \hat{H}_{UL\_UE} \cdot s_{UL\_UE} \quad (4)$$
$$= r_{intercell} + r_{PIM} + r_{noise} + r_{chanEstError}$$

where:

$\hat{H}_{UL\_UE} \in \mathbb{C}^{N \times Q}$ is an estimate of the uplink channel response for the Q scheduled uplink WDs 22;

$s_{UL\_UE} \in \mathbb{C}^{Q \times 1}$ is the vector of the known symbols that are transmitted by the WDs 22 on the pilot resource elements; and $r_{chanEstError} \in \mathbb{C}^{N \times 1}$ is the vector of the channel estimation errors.

Working with $r_{residual}$ has certain advantages as it may nearly eliminate the contributions of the scheduled WDs 22, thus simplifying the discrimination task of the post-processing step. On the other hand, the $r_{residual}$ vector may only be available on the pilot resource elements which reduces the density of the collected data along both the frequency and the time axes.

Another aspect of the frequency-domain data collection relates to the length of the averaging process:

On the short side, symbol-based covariance matrices may be built on a PRB or a sub-band granularity as follows:

$$R_{UL,b,t} = \frac{1}{U} \cdot \Sigma_{u=start}^{start+U-1} r_{UL,u,t} \cdot r_{UL,u,t}^H \quad (5)$$

where
u is the subcarrier index;
start is the subcarrier index of the first subcarrier within the sub-band or the PRB;
b is the sub-band or the PRB index;
U corresponds to the number of subcarriers in the sub-band or in the PRB; and
t is the time index of the OFDM symbol.

A purpose of symbol-based covariance matrices in the frequency-domain is for mapping the UL eigenvalues to the corresponding symbol-based DL transmitted power as in the time-domain embodiment, but with a finer frequency granularity. This may be useful for very wideband Fifth Generation (5G) New Radio (NR) carriers where it is desirable to break the PIM-detection process into smaller sub-bands.

At the other extreme, the very long-term averaging processes spanning few hundreds of milliseconds may be mainly used for mapping the UL eigenvalue against frequency, thus revealing the PIM spectrum as in FIG. 6.

Once the data collection step is completed, the frequency-domain eigenvalues may go through some pre-selection and post-processing steps as illustrated in FIG. 4, as described above.

Alternative Data Collection in Time and Frequency Domains

In both the time-domain and the frequency-domain embodiments, some hybrid arrangements are also possible where the UL symbols are routed to different long-term averaging processes, depending on the associated DL transmitted power (i.e., DL power binning). An advantage of this hybrid scheme is to reduce the number of eigenvalue decompositions while retaining the ability to fit the PIM properties as a function of the DL power.

Figure 7:
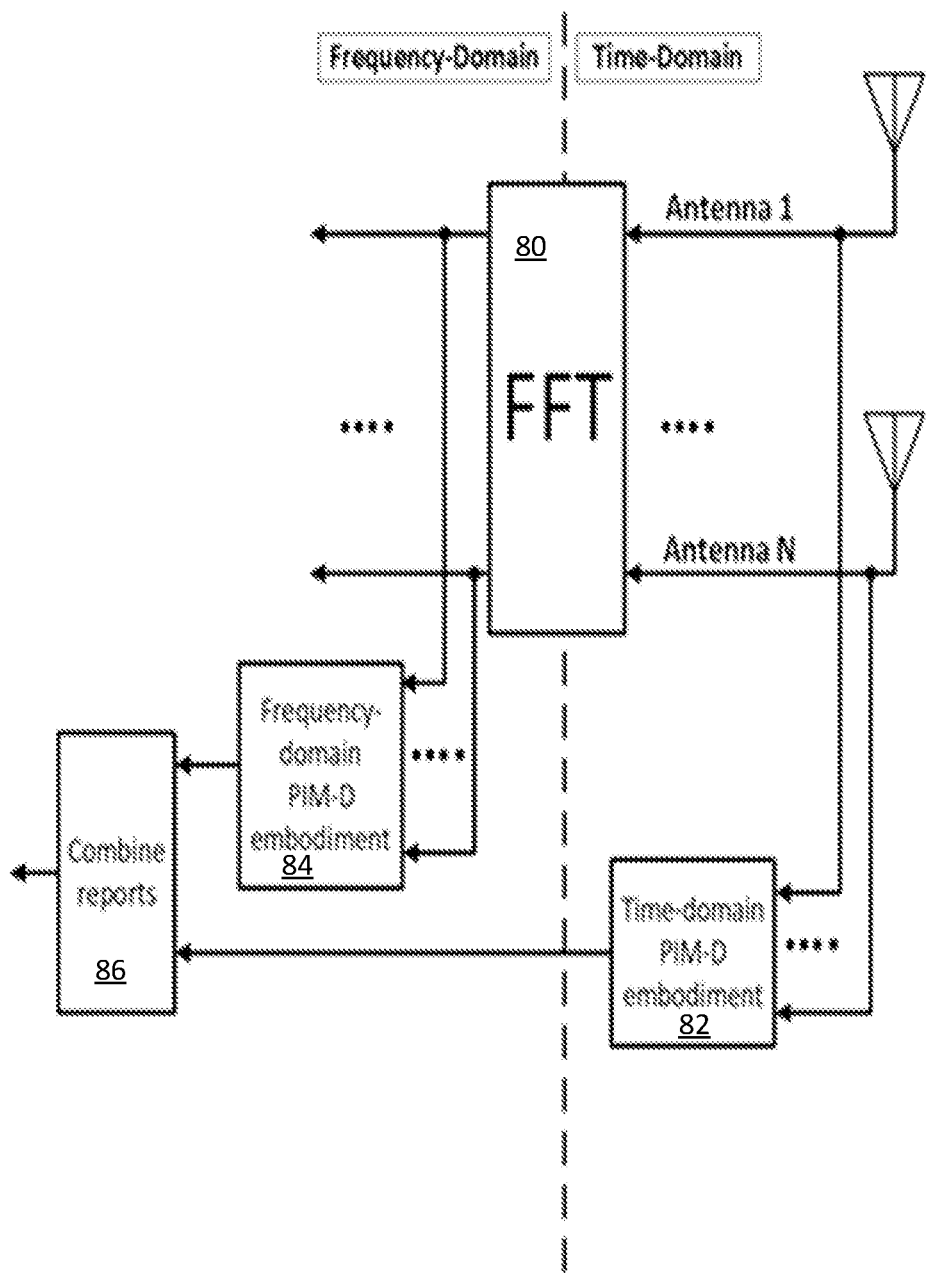
FIG. 7 is a flowchart of a process for detecting and reporting PIM according to methods described herein.

The time-domain and the frequency-domain embodiments that have been described so far may be combined for enhanced robustness as shown in FIG. 7. FIG. 7 shows that each antenna signal is transformed by a fast Fourier transform (FFT) 80 and presented to the RF front end (not shown) for processing received antenna signals. FIG. 7 also shows that a time domain PIM detection embodiment 82 implemented by processing circuitry 48 provides a first PIM report and the frequency domain signals are fed to a frequency domain PIM detection embodiment 84 implemented by processing circuitry 48 to provide a second PIM report. The first and second PIM reports may be combined by combiner 86 to produce a final binary PIM report. The binary PIM reports that are generated by each of these embodiments may be combined using Boolean logic. In more complex embodiments, the reports may be weighted to minimize the error rate or to meet a desired operating point on the ROC curve. Known boosting methods may be used to weight the contribution of each classifier.

Some embodiments have been described when the total received uplink signal $r_{UL}$ is captured in the antenna domain. It can be appreciated that the antenna domain signals could be transformed into some other domain (e.g., with a spatial discrete Fourier transform (DFT))—and then embodiments could be applied to the transformed signals in the new domain. In this case, $r_{UL}$ would be the signal at the output of the transformation.

PIM-detection is not a delay sensitive feature. Therefore, some parts of the processing may be offloaded to the cloud. Note that it may be preferable to keep the data collection process inside the edge computing resources (i.e., the radio site equipment) to facilitate the synchronization between the UL and the DL data and to reduce the interface bandwidth requirement to the cloud.

Thus, according to one aspect, a method for detection of passive intermodulation, PIM, in a network node 16 based at least in part on uplink, UL, channel eigenvalues is provided. The method includes determining, via the covariance matrix unit 56, the values of a covariance matrix based at least in part on uplink signals received by the network node radio. The method also includes determining, via the eigenvalue analyzer unit 32, a plurality of UL channel eigenvalues based at least in part on an eigen-component acquisition technique. The method also includes determining, via the PIM detection unit 58, a presence or absence of PIM based at least in part on a plurality of the UL channel eigenvalues.

According to this aspect, in some embodiments, the eigen-component acquisition technique is one of determining eigenvalues from the covariance matrix values or sub-space tracking. In some embodiments, the plurality of UL channel eigenvalues are determined in the time-domain and/or in the frequency-domain, using an entire channel bandwidth and/or a frequency resolution less than the entire channel bandwidth. In some embodiments, different UL channel eigenvalues are determined, via the processing circuitry 48, for each of a plurality of polarizations of antennas of the network node radio and the presence or absence of PIM is determined for each of the plurality of polarizations. In some embodiments, the plurality of UL channel eigenvalues are mapped, via the processing circuitry 48, against a corresponding downlink transmitted power to determine the presence or absence of PIM. In some embodiments, the UL channel eigenvalues failing to meet an objective criteria are excluded, via the processing circuitry 48, from the process of determining a presence or absence of PIM. In some embodiments, a machine learning algorithm processes at least some of the UL channel eigenvalues to determine the presence or absence of PIM. In some embodiments, the machine learning algorithm is one of a regression method, a classification method or a combination of the two. In some embodiments, the plurality of UL channel eigenvalues are evaluated, via the processing circuitry 48, without aid of a machine learning algorithm to determine a presence or absence of PIM. In some embodiments, the process of determining the presence or absence of PIM is performed in both the time domain and the frequency domain to produce a time domain report of PIM presence and a frequency domain report of PIM presence. In some embodiments, the time domain report and the frequency domain report are separately weighted and combined to produce a composite report of PIM presence.

According to another aspect, a network node radio configured to detect passive intermodulation, PIM, based at least in part on uplink, UL, channel eigenvalues. The network node includes processing circuitry configured to determine, via the covariance matrix unit 56, values of a covariance matrix based at least in part on uplink signals received by the network node radio. The processing circuitry is also configured to determine, via the eigenvalue analyzer unit 32, a plurality of UL channel eigenvalues based at least in part on an eigen-component acquisition technique. The processing circuitry is also configured to determine, via the PIM detection unit 58, a presence or absence of PIM based at least in part on a plurality of the UL channel eigenvalues.

According to this aspect, in some embodiments, the eigen-component acquisition technique is one of determining eigenvalues from the covariance matrix values or sub-space tracking. In some embodiments, the plurality of UL channel eigenvalues are determined, via the processing circuitry 48, in the time domain and/or frequency domain, using an entire channel bandwidth and/or a frequency resolution less than the entire channel bandwidth. In some embodiments, different UL channel eigenvalues are determined, via the processing circuitry 48, for each of a plurality of polarizations of antennas of the network node radio and the presence or absence of PIM is determined for each of the plurality of polarizations. In some embodiments, the plurality of UL channel eigenvalues are mapped, via the processing circuitry 48, against a corresponding downlink transmitted power to determine the presence or absence of PIM. In some embodiments, UL channel eigenvalues failing to meet an objective criteria are excluded from the process of determining a presence or absence of PIM. In some embodiments, a machine learning algorithm processes at least some of the UL channel eigenvalues to determine the presence or absence of PIM. In some embodiments, the machine learning algorithm is one of a linear regression algorithm, a kernel regression algorithm, a polynomial regression algorithm and a spline regression algorithm. In some embodiments, the plurality of UL channel eigenvalues are evaluated without aid of a machine learning algorithm to determine a presence or absence of PIM. In some embodiments, the process of determining the presence or absence of PIM is performed in both the time domain and the frequency domain to produce time domain report of PIM presence and a frequency domain report of PIM presence. In some embodiments, the time domain report and the frequency domain report are separately weighted and then combined to produce a composite report of PIM presence.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Some abbreviations that may be used herein are as follows:

| Abbreviation | Explanation |
| --- | --- |
| 5G | Fifth Generation |
| dB | Decibel |
| DL | Downlink |
| FFT | Fast Fourier Transform |
| LTE | Long-Term Evolution |
| NR | New Radio |
| PIM | Passive Intermodulation |
| PIM-D | PIM-Detection |
| PRB | Physical Resource Block |
| ROC | Receiver Operating Characteristic |
| TTI | Transmit Time-Interval |
| UL | Uplink |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for detection of passive intermodulation, PIM, in a network node radio based at least in part on uplink, UL, channel eigenvalues, the method comprising:
   determining values of a covariance matrix based at least in part on uplink signals received by the network node radio;
   determining a plurality of UL channel eigenvalues based at least in part on an eigen-component acquisition technique; and
   determining a presence or absence of PIM based at least in part on the plurality of the UL channel eigenvalues.

2. The method of claim 1, wherein the eigen-component acquisition technique is one of determining eigenvalues from the covariance matrix values or subspace tracking.

3. The method of claim 1, wherein the plurality of UL channel eigenvalues are determined one or more of in a time-domain, a frequency-domain, using an entire channel bandwidth and a frequency resolution less than the entire channel bandwidth.

4. The method of claim 1, wherein different UL channel eigenvalues are determined for each of a plurality of polarizations of antennas of the network node radio and the presence or absence of PIM is determined for each of the plurality of polarizations.

5. The method of claim 1, wherein the plurality of UL channel eigenvalues are mapped against a corresponding downlink transmitted power to determine the presence or absence of PIM.

6. The method of claim 1, wherein UL channel eigenvalues failing to meet an objective criteria are excluded from the process of determining the presence or absence of PIM.

7. The method of claim 1, wherein a machine learning algorithm processes at least some of the UL channel eigenvalues to determine the presence or absence of PIM.

8. The method of claim 7, wherein the machine learning algorithm is one of a regression method, a classification method or a combination of the two.

9. The method of claim 1, wherein the plurality of UL channel eigenvalues are evaluated without aid of a machine learning algorithm to determine the presence or absence of PIM.

10. The method of claim 1, wherein the process of determining the presence or absence of PIM is performed in both a time domain and a frequency domain to produce a time domain report of PIM presence and a frequency domain report of PIM presence.

11. The method of claim 10, wherein the time domain report and the frequency domain report are separately weighted and combined to produce a composite report of PIM presence.

12. A network node configured to detect passive intermodulation, PIM, based at least in part on uplink, UL, channel eigenvalues, the network node comprising processing circuitry (48) configured to:
  determine values of a covariance matrix based at least in part on uplink signals received by the network node radio;
  determine a plurality of UL channel eigenvalues based at least in part on an eigen-component acquisition technique; and
  determine a presence or absence of PIM based at least in part on a plurality of the UL channel eigenvalues.

13. The network node of claim 12, wherein the eigen-component acquisition technique is one of determining eigenvalues from the covariance matrix values or subspace tracking.

14. The network node of claim 12, wherein the plurality of UL channel eigenvalues are determined one of more of in a time domain, in a frequency domain, using an entire channel bandwidth and a frequency resolution less than the entire channel bandwidth.

15. The network node of claim 12, wherein different UL channel eigenvalues are determined for each of a plurality of polarizations of antennas of the network node radio and the presence or absence of PIM is determined for each of the plurality of polarizations.

16. The network node of claim 12, wherein the plurality of UL channel eigenvalues are mapped against a corresponding downlink transmitted power to determine the presence or absence of PIM.

17. The network node of claim 12, wherein UL channel eigenvalues failing to meet an object criteria are excluded from the process of determining the presence or absence of PIM.

18. The network node of claim 12, wherein a machine learning algorithm processes at least some of the UL channel eigenvalues to determine the presence or absence of PIM.

19. The network node of claim 18, wherein the machine learning algorithm is one of a regression method, a classification method or a combination of the two.

20. The network node of claim 12, wherein the plurality of UL channel eigenvalues are evaluated without aid of a machine learning algorithm to determine the presence or absence of PIM.

21. The network node of claim 12, wherein the process of determining the presence or absence of PIM is performed in both the time domain and the frequency domain to produce time domain report of PIM presence and a frequency domain report of PIM presence.

22. The network node of claim 21, wherein the time domain report and the frequency domain report are separately weighted and then combined to produce a composite report of PIM presence.

* * * * *